United States Patent
Wack

(10) Patent No.: US 7,651,399 B2
(45) Date of Patent: Jan. 26, 2010

(54) TORSIONAL VIBRATION DAMPER

(75) Inventor: Erwin Wack, Niederwerrn (DE)

(73) Assignee: ZF Friedrichshafen AG, Friedrichshafen (DE)

(*) Notice: Subject to any disclaimer, the term of this patent is extended or adjusted under 35 U.S.C. 154(b) by 303 days.

(21) Appl. No.: 11/732,349

(22) Filed: Apr. 3, 2007

(65) Prior Publication Data

US 2007/0240472 A1  Oct. 18, 2007

(30) Foreign Application Priority Data

Apr. 12, 2006  (DE) ................. 10 2006 017 227

(51) Int. Cl.
   *F16F 15/121* (2006.01)
(52) U.S. Cl. ..................... 464/68.9; 464/67.1
(58) Field of Classification Search ............. 464/67.1, 464/68.9
   See application file for complete search history.

(56) References Cited

U.S. PATENT DOCUMENTS

| | | | |
|---|---|---|---|
| 3,456,684 A * | 7/1969 | Sochting | |
| 5,052,664 A * | 10/1991 | Lesher et al. | 464/67.1 |
| 5,464,198 A | 11/1995 | Yanko et al. | |
| 5,769,722 A * | 6/1998 | Uehara | 464/68.9 |
| 6,244,962 B1 * | 6/2001 | Bacher et al. | 464/67.1 |
| 6,547,227 B1 * | 4/2003 | Mende | |
| 2005/0239557 A1 | 10/2005 | Wack et al. | |

FOREIGN PATENT DOCUMENTS

| | | |
|---|---|---|
| DE | 42 29 416 | 3/1993 |
| DE | 44 07 562 | 9/1995 |
| DE | 10 2004 019 223 | 11/2005 |
| EP | 0 798 489 | 10/1997 |

* cited by examiner

*Primary Examiner*—Greg Binda
(74) *Attorney, Agent, or Firm*—Cohen Pontani Lieberman & Pavane LLP

(57) ABSTRACT

A torsional vibration damper includes a plurality of coil springs which are each received in a pair of windows of respective takeoff side and drive side transmission elements. Each spring has a pair of opposed final turns separated by a plurality of intermediate turns, wherein each final turn is against a circumferential boundary of a respective window. Each final turn has a tip area which is in contact with an adjacent intermediate turn, the final turn being separated from the adjacent intermediate turn by a first distance which increases from the tip area to a maximum value within a predetermined angle $\phi$ following the tip area. This maximum value, in a load-free state of the springs, is essentially the same as a second distance separating adjacent intermediate turns.

8 Claims, 3 Drawing Sheets

B

C-C

TORSIONAL VIBRATION DAMPER

BACKGROUND OF THE INVENTION

1. Field of the Invention

The invention pertains to a torsional vibration damper of the type having a drive side transmission element having a plurality of receiving windows; a takeoff side transmission element having a plurality of receiving windows which are aligned with respective drive side receiving windows; and a plurality of coil springs received in the receiving windows, wherein each spring is received in a pair of windows of respective takeoff side and drive side transmission elements, and each final turn is against a circumferential boundary of a respective window.

2. Description of the Related Art

A torsional vibration damper with drive-side transmission elements and with a takeoff-side transmission element, which can be deflected around a certain rotational angle relative to the drive-side elements, is known from DE 42 29 416 A1, where the transmission elements have receiving areas for coil springs, at least one circumferentially final turn of each device being supported against a circumferential boundary of the receiving area. Each final turn is provided with a flat-ground section on the side facing the boundary. Beginning from the free tip of the final turn, this flat-ground section extends around a predetermined angle and thus increases the size of the surface by which the final turn makes contact with the associated circumferential boundary.

Because of the flat-ground section, the final turn, especially in the immediate area of its tip, is left with a residual cross section which can be less by 0.1 times that of the cross section of the intermediate turn adjacent to it in the circumferential direction, referred to below in brief as the "adjacent intermediate turn". Starting from the tip of the final turn, the flat-ground section can extend easily around an angle of 300-340°, which means that the final turn must make do with a residual cross section which is many times smaller than the cross section of the intermediate turns over this entire angular distance.

Because of its small residual cross section, as can be derived from the drawing of DE 42 29 416 A1, the final turn must remain in contact with the adjacent intermediate turn around a considerable angular distance, because otherwise it is likely that the final turn would break when torque is applied. As a result, when there is no load acting on the coil spring, there are gaps only between the intermediate turns themselves. These are the gaps which form the coil spring action space which is available for use when load is applied to the coil spring and thus compresses it. The torsional vibration damper thus loses some of its deformation distance. This is disadvantageous when the coil springs of the torsional vibration damper are designed to be compact in the circumferential direction, but it is even more disadvantageous when, in accordance with US 2005/0239557, the devices are also installed in receiving areas in the form of individual windows for each coil spring. In the case of a torsional vibration damper of this type, therefore, each coil spring has two final turns, each provided with a flat-ground section.

SUMMARY OF THE INVENTION

The invention is based on the task of designing a torsional vibration damper in such a way that the execution of the final turns, each of which has a flat-ground section, is not associated with a loss of deformation distance.

According to the invention, the final turn is supported against the turn next to it in the circumferential direction, referred to in brief below as the "adjacent intermediate turn", only in the immediate area of the final turn's tip. Outside this immediate area of the final turn's tip, the adjacent intermediate turn is separated from the final turn by a distance which increases to a value "a", thus creating an action space for the final turn of the coil spring, where this first distance "a" assumes a maximum value within a predetermined angle $\phi$ following the immediate area of the final turn's tip. As long as no load is acting on the coil spring, this maximum value corresponds at least essentially to a second distance "b" between two adjacent intermediate turns. As a result of this second distance "b", there are intermediate action spaces between all of the adjacent intermediate turns of the coil spring. The final coil spring action space should be of such a size that, when the coil spring is in a load-free state, the ratio between the final action space and the intermediate action space is within a range of 0.7-1.1, and preferably within a range of 0.8-1.0. The two coil spring action spaces then reach their maximum values when the predetermined angle $\phi$ reaches its maximum value in the individual case, therefore preferably a value at least on the order of essentially 180°.

To protect the final turn, which is not supported against the adjacent intermediate turn except in the immediate area of its tip, from the risk of breakage, the ratio of the diameter of the residual cross section of the final turn to that of the adjacent intermediate turn should have a predetermined value at every point along its length. Thus the ratio between the residual cross section of the final turn in the area of its tip and the cross section of the intermediate turns should be within a range of 0.1-0.4, and preferably within a range of 0.2-0.3, whereas the ratio between the residual cross section of the final turn in the area where it reaches the predetermined angle $\phi$ following the immediate area of the tip and the cross section of the intermediate turns should assume a transitional value within a range of 0.6-1.0, and preferably in the range of 0.8-1.0.

Of course, the inventive embodiment of the coil springs can be applied both to straight coil springs and also to precurved coil springs. In cases where the coil springs are precurved around an axis of rotation, the final turn's tip is provided at least essentially at the radially inner edge of the associated final turn, whereas the first distance "a" forming the final action space of the coil spring is provided at least essentially at the radially outer edge of the associated final turn, and the second distance "b" forming the intermediate action space is provided at least essentially at the radially outer edge of the intermediate turn adjacent to the final turn.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
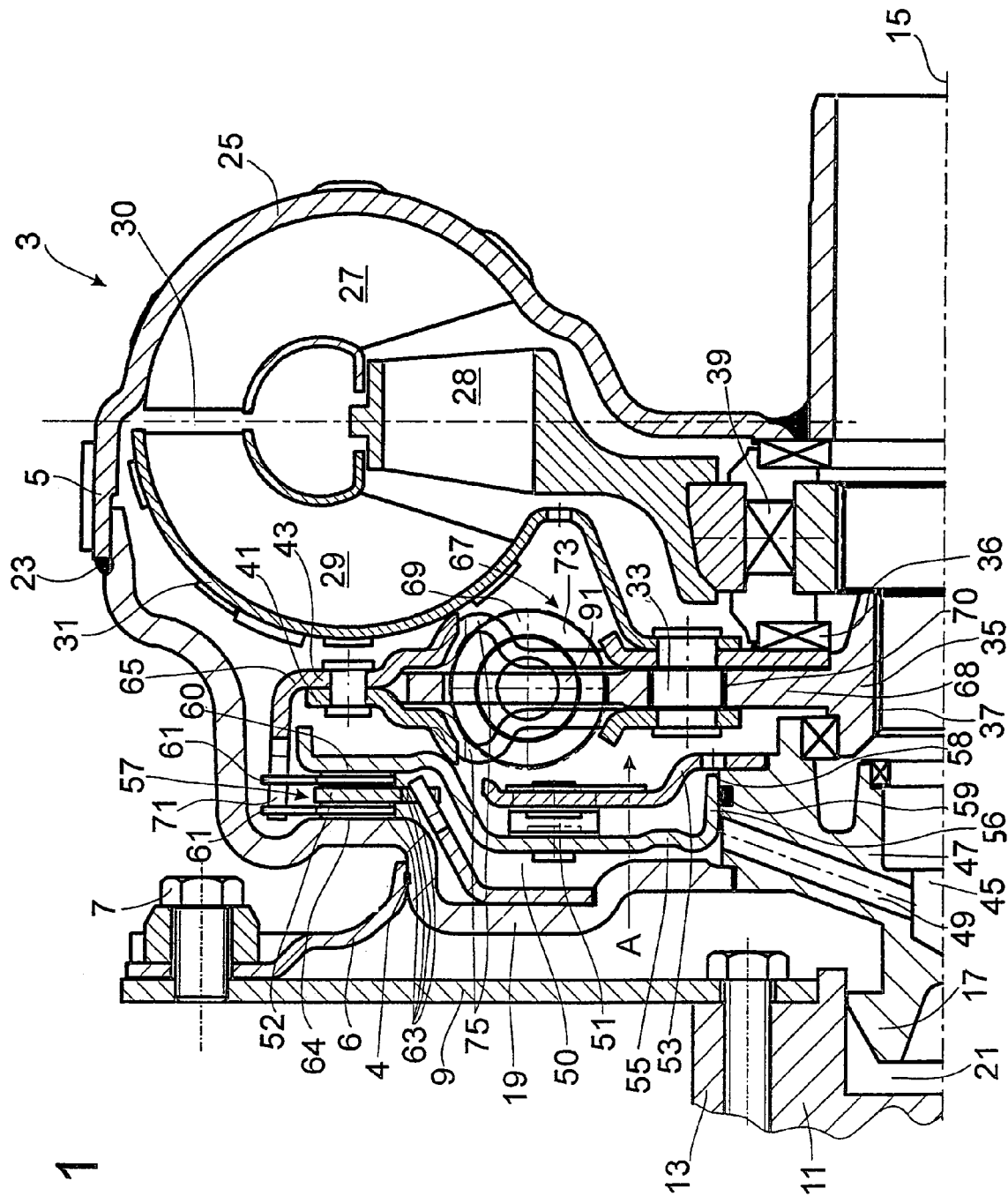
FIG. 1 shows the upper half of a longitudinal cross section through a hydrodynamic clutch arrangement with a torsional vibration damper with coil springs.

The hydrodynamic clutch device 3 shown in FIG. 1 has a clutch housing 5, to which a connecting plate 6 is attached by means of a weld 4. The connecting plate can be connected to a drive 11, such as the crankshaft 13 of an internal combustion engine, for rotation in common by a plurality of mounting elements 7 and a connector element 9 such as a flexplate.

The clutch device 3 also has a bearing journal 17 in the area of an axis of rotation 15. This journal is provided on the cover 19 of a housing 5 and is mounted in a centering guide 21 in the drive 11.

The cover 19 is permanently connected by a weld 23 to a pump wheel shell 25 of a pump wheel 27, which cooperates with a turbine wheel 29 and with a stator 28 to form a hydrodynamic circuit 30. The turbine wheel 29 has a turbine wheel shell 31, which is centered on a turbine wheel hub 35, which comes to rest by way of an axial bearing 36 against a freewheel 39 of the stator 28. The turbine wheel hub 35 is connected by means of a set of teeth 37 for rotation in common to a gearbox input shaft (not shown) located radially inside the turbine wheel hub. These types of gearbox input shafts are usually provided with a central bore, which leads to a transition space 45, which is connected by through-openings 49 in a housing hub 47 to a pressure chamber 50, located axially between the cover 19 and a piston 55 of the bridging clutch 57. A piston carrier 53 is attached to the piston 55 by means of tangential leaf springs 51 for the production of a nonrotatable connection between the piston 55 and the cover 19 via the housing hub 47.

The piston 55 has a piston base 56 at the radially inner end by which it is mounted with a sealing action by means of a seal 59 on a mounting surface 58 of the housing hub 47, whereas its radially outer area has a friction surface 60 by which it rests against a friction lining 63 of a clutch plate 61, where this plate 61 can support itself against the friction surface 64 of the cover 19 by means of an additional friction lining 63, an intermediate plate 52, and another plate 61 with friction linings 63 on both sides. The plates 61 are each connected nonrotatably to sets of teeth 71 of a drive-side transmission element 65 of a torsional vibration damper 67, where this drive-side transmission element 65, formed by cover plates 41 and 43, is attached by rivets 33 to the turbine wheel shell 31. The drive-side transmission element 65 is supported by a set of circumferential springs 69 against a takeoff-side transmission element 68 of the torsional vibration damper 67, formed in this concrete embodiment by the turbine wheel hub 35. The relative rotational deflection between the drive-side transmission element 65 and the takeoff-side transmission element 68 is limited by the rivets 33, which engage with predetermined circumferential play in assigned openings 70.

Figure 2:
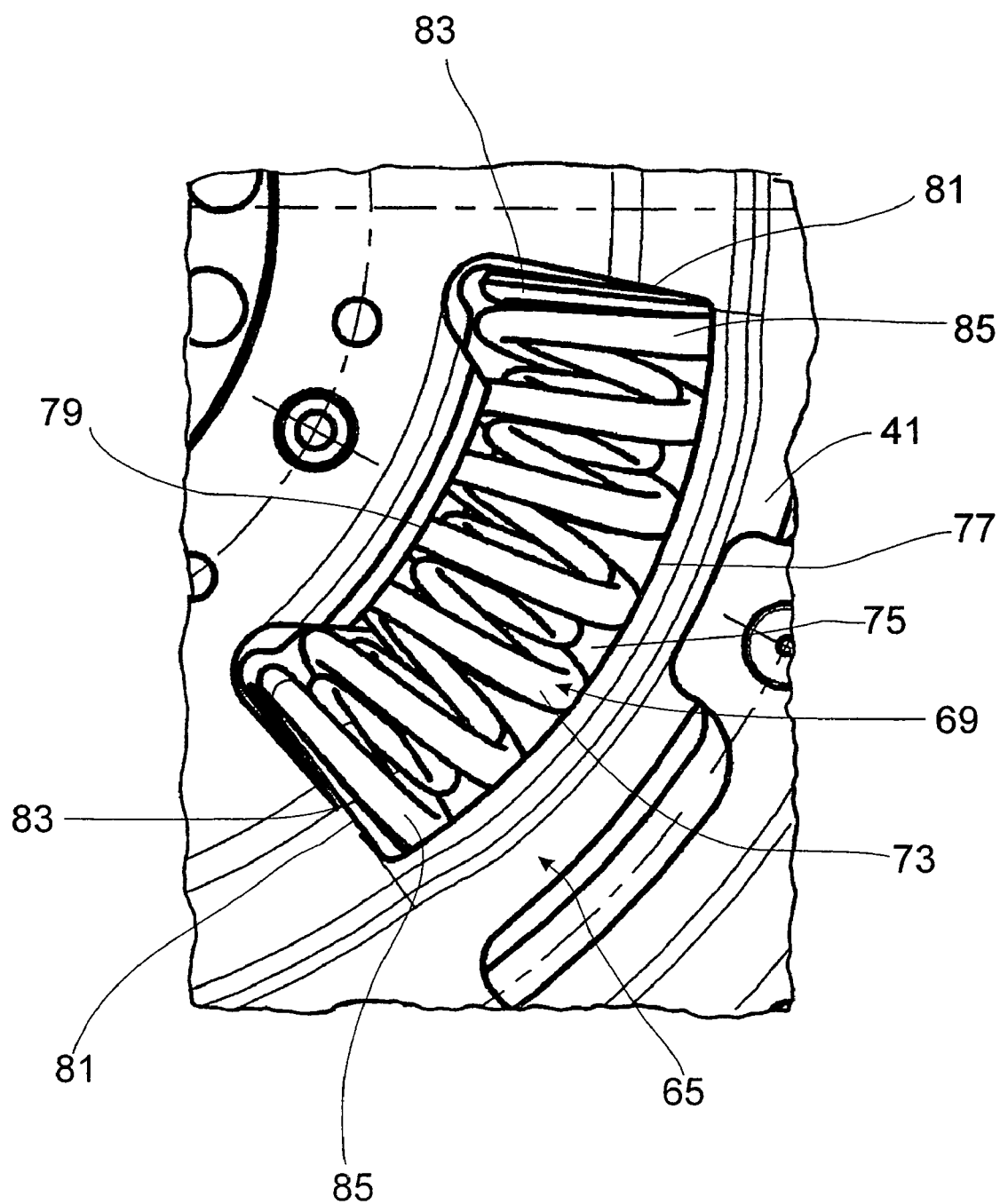
FIG. 2 shows a plan view of part of the torsional vibration damper in viewing direction A of FIG. 1 with a coil spring, which has final turns at each circumference end, each of which is followed in the circumferential direction by an adjacent intermediate turn.

FIG. 2 shows the cover plate 41 of the drive-side transmission element 65 of the torsional vibration damper 67, i.e., the cover plate which faces the piston 55 of the bridging clutch 57, where coil springs 73 of the circumferential spring set 69 are accommodated in windows 75, which are designed as openings in the cover plate 41 and also in the cover plate 43 facing the turbine wheel 29. Each coil spring 73 held in one of the windows 75 is also in working connection with radially outward-extending drive elements 91 (FIG. 1), which are provided on the takeoff-side transmission element 68, that is, on the turbine wheel hub 35.

As can be easily derived from FIG. 2, each window 75 consists of a radially outer side 77 and a radially inner side 79, by which two circumferential boundaries 81 are connected to each other. The coil spring 73 installed in a window 75 has final turns 83 at the circumferential ends, each of which faces one of the circumferential boundaries 81 of the window 75, and a plurality of turns 85, referred to in the following as "intermediate" turns, which are arranged next to each other in the circumferential direction between the two final turns 83 at the circumferential ends.

FIG. 2 shows the state of the coil springs 73 inside their windows 75 when freedom of rotational deflection exists between the two transmission elements 65 and 68 of the torsional vibration damper 67. The individual coil springs 73 have a precurvature with respect to the axis of rotation 15 (FIG. 1) and are inserted without pretension into the associated window 75. The precurvature is best seen in FIG. 3, where the coil springs 73 have a center line 92 corresponding to their curvature.

Figure 3:
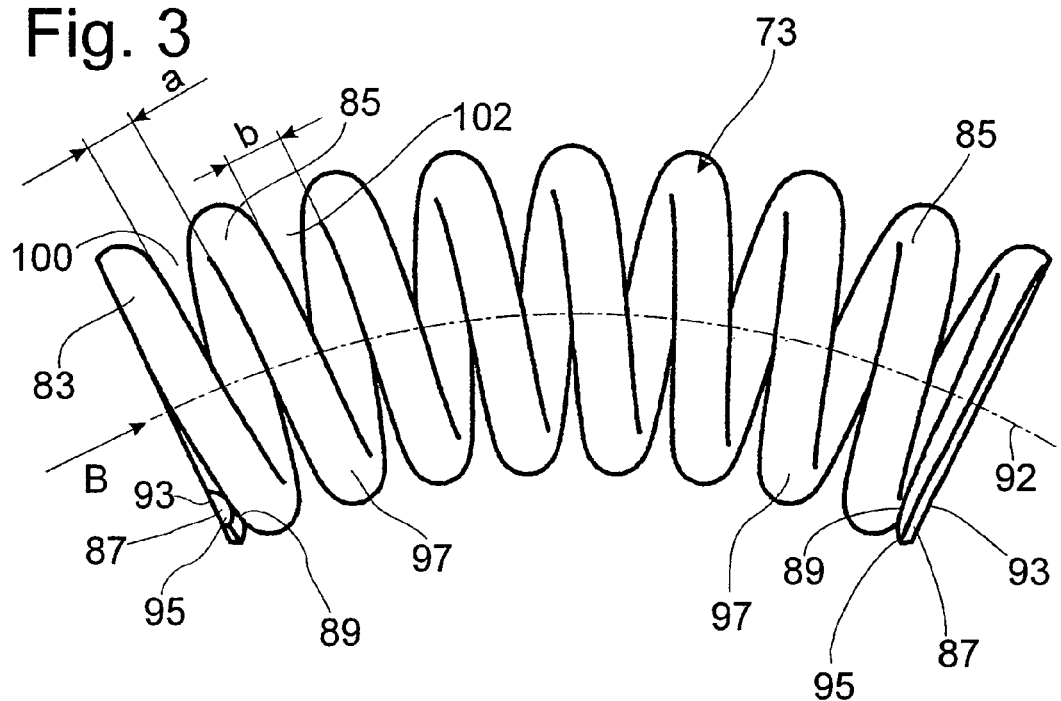
FIG. 3 shows a detailed view of the coil spring of FIG. 2.
Figure 4:
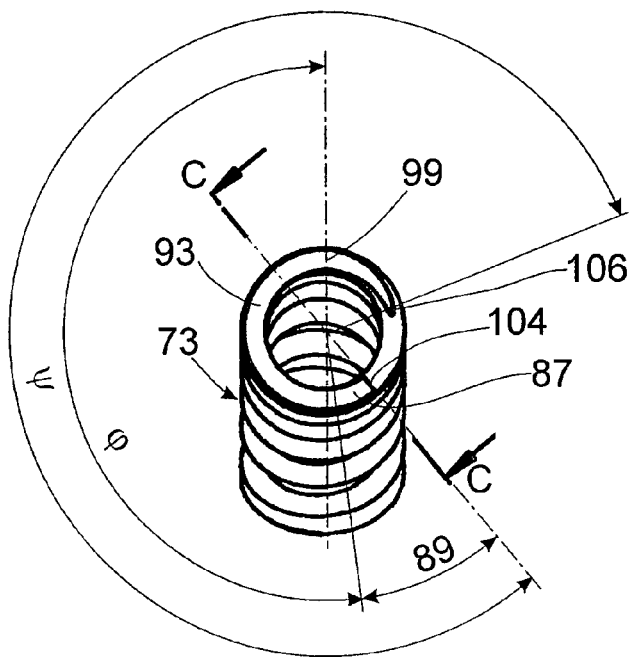
FIG. 4 shows a view of the coil spring in viewing direction B of FIG. 3.
Figure 5:
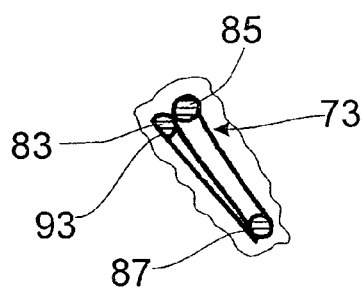
FIG. 5 shows a cross-sectional view along line C-C of FIG. 4.

As is especially clear from FIGS. 3-5, the final turns 83 of each coil spring 73 are provided with flat-ground areas 93 where the turns make contact with the circumferential boundaries 81 (FIG. 2), so that at least an essentially flat contact is obtained with the opposing assigned boundary 81. This flat-ground section 93 extends over an angle $\Psi$, which is preferably in the range of 280-320°.

Because of this flat-ground section 93, the final turn 83 is left with a residual cross section 95, present especially in an area 89 of the tip 87. This residual cross section is relatively small in comparison to the cross sections 97 of the intermediate turns 85, and the ratio of the residual cross section to that of the intermediate turns preferably remains within a range of 0.1-0.4, and even more preferably within a range of 0.2-0.3. When torque is introduced by way of one of the circumferential boundaries 81 or one of the drive elements 91, the final turn 83, especially the tip 87 of the final turn, is supported against the adjacent turn 85 within the area 89 and is able therefore to transmit even relatively high torques without damage.

Following the area 89 in the angular direction there is a predetermined angle $\phi$ (FIG. 4), within which the ratio of the cross section of the final turn 83 to that of the intermediate turns 85 in the load-free state of the coil spring 73 increases very quickly to 0.6-1.0, preferably to 0.8-1.0. This gives the final turn 83 the strength it requires to transmit an introduced torque. At the same time, because the adjacent intermediate turn 85 quickly becomes farther away from the final turn 83 with increasing angular distance from the area 89, a gap is formed, which is available as a deformation distance for the coil spring 73 upon introduction of a torque via one of the circumferential boundaries 81 or via one of the drive elements 91. This gap assumes what is at least essentially its maximum value at the point 99 of angle $\phi$ which is the farthest away from the area 89 of the tip 87 of the final turn, and preferably at least essentially 180° away from that area. As a result, the distance "a" is created, which forms the action space 100 for the final coil springs. The ratio of the final coil spring action space 100 to the intermediate coil spring action space 102 created by the distance "b" between two adjacent intermediate turns 85 is preferably within a range of 0.8-1.0.

If the coil spring 73 is precurved as shown in FIG. 3, the distances-"a" and "b" and thus the coil spring action spaces 100 and 102 are preferably radially on the outside, whereas the tip 87 of the final turn is preferably radially on the inside. The point of the greatest angular distance 99 of the predetermined angle ϕ therefore lies, as can be seen in FIG. 4, at least essentially at the radially outer edge; a free end 104 of the final turn's tip 87 lies radially inside the coil spring center line 92; and a transition area 106 between the flat-ground section 93 and the area of the final turn 83 without a flat-ground section 93 lies radially outside the coil spring center line 92.

As a result of the design of the coil spring 73 described above, the device gains the distance "a" at each of its two circumferential ends, and thus the deformation distance available in each of the coil spring action spaces 100 is greater than that of a design according to the state of the art.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torsional vibration damper comprising:
   a drive side transmission element having a plurality of receiving windows;
   a takeoff side transmission element having a plurality of receiving windows which are aligned with respective said receiving windows of said drive side transmission element, each said window having a pair of opposed circumferential boundaries; and
   a plurality of coil springs, wherein each said coil spring has a spring axis which is pre-curved about an axis of rotation of the vibration damper, each said spring being received in a pair of windows of respective takeoff side and drive side transmission elements, each said spring having a pair of opposed final turns separated by a plurality of intermediate turns, each final turn being against a circumferential boundary of a respective window, whereby said drive side transmission element can deflect though a limited angle of rotation with respect to said takeoff side transmission element;
   wherein each said final turn ends in a free end with an adjacent tip area which is in contact with an adjacent intermediate turn, each said tip area lying radially between said spring axis and said axis of rotation, each said final turn being separated from said adjacent intermediate turn by a first distance which increases from said tip area to a maximum value within a predetermined angle ϕ following the tip area, said intermediate turns being separated by a second distance, said maximum value of said first distance and said second distance lying radially essentially outermost with respect to said axis of rotation, wherein said maximum value of said first distance, in a load-free state of the springs, is in a ratio of 0.7 to 1.1 to said second distance.

2. The torsional vibration damper of claim 1 wherein each said final turn has a flat ground section extending from said free end over a predetermined angle Ψ said free end having a cross-sectional area in a ratio of 0.1 to 0.4 to the cross-sectional area of the adjacent intermediate turn, whereas, at the end of said angle ϕ opposite said tip area, the final turn has a cross-sectional area in a ratio of 0.6 to 1.0 to the cross-sectional area of the adjacent intermediate turn.

3. The torsional vibration damper of claim 2 wherein said free end has a cross-sectional area in a ratio of 0.2 to 0.3 to the cross-sectional area of the adjacent intermediate turn, whereas, at the end of said angle ϕ opposite said tip area, the final turn has a cross-sectional area in a ratio of 0.8 to 1.0 to the cross-sectional area of the adjacent intermediate turn.

4. The torsional vibration damper of claim 2 wherein said angle Ψ is at least 280°.

5. The torsional vibration damper of claim 2 wherein said angle Ψ is no more than 320°.

6. The torsional vibration damper of claim 1 wherein said maximum value of said first distance, in a load-free state of the springs, is in a ratio of 0.8 to 1.0 to said second distance.

7. The torsional vibration damper of claim 6 wherein said maximum value of said first distance, in a load-free state of the springs, is essentially the same as said second distance.

8. The torsional vibration damper of claim 1 wherein said angle ϕ is at least 180°.

* * * * *